(12) United States Patent
Lehman

(10) Patent No.: US 9,759,341 B2
(45) Date of Patent: *Sep. 12, 2017

(54) FREEZE TOLERANT BALL VALVE

(71) Applicant: Ronald Lehman, Thornton, CO (US)

(72) Inventor: Ronald Lehman, Thornton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/093,016

(22) Filed: Apr. 7, 2016

(65) Prior Publication Data

US 2016/0223096 A1 Aug. 4, 2016

Related U.S. Application Data

(63) Continuation of application No. 14/737,067, filed on Jun. 11, 2015, now Pat. No. 9,334,966, which is a
(Continued)

(51) Int. Cl.
*F16K 3/22* (2006.01)
*F16K 17/16* (2006.01)
(Continued)

(52) U.S. Cl.
CPC ............... *F16K 17/16* (2013.01); *F16K 3/22* (2013.01); *F16K 5/06* (2013.01); *F16K 17/14* (2013.01); *F16K 27/04* (2013.01); *F16K 27/067* (2013.01)

(58) Field of Classification Search
CPC ........ F16K 27/067; F16K 27/04; F16K 17/14; F16K 5/06; F16K 13/04; F16K 17/403; F16K 17/16; F16K 3/22
(Continued)

(56) References Cited

U.S. PATENT DOCUMENTS 2,039,220 A 4/1936 Heggem
2,117,907 A 5/1938 Ogden
(Continued)

FOREIGN PATENT DOCUMENTS

EP 1225381 7/2002
EP 2110589 10/2009
(Continued)

*Primary Examiner* — Craig Schneider
*Assistant Examiner* — P. Macade Nichols

(57) ABSTRACT

A freeze tolerant ball valve for controlling the direction of expansion of freezing water within the ball valve is disclosed. The valve includes valve body inlet and the valve body outlet, and a spherical-shaped gate that has an axial fluid passage that extends through the spherical-shaped gate. The spherical-shaped gate can be rotated to block fluid communication between the valve body inlet and the valve body outlet. The valve body also has a first sidewall that is of a first sidewall thickness, and a sidewall having a boss that supports a concave cap that has a bottom wall that is of a bottom wall thickness, the bottom wall thickness being substantially thinner than the sidewall thickness. The cooperation of the passage through the spherical-shaped gate, the first sidewall with its first sidewall thickness positioned opposite to the bottom wall of the concave cap results in a valve that directs the effects of freezing on to the concave cap, which would fail first in the event of freezing. The cap can be easily and quickly replaced in the event of failure.

17 Claims, 3 Drawing Sheets

Related U.S. Application Data continuation of application No. 13/968,296, filed on Aug. 15, 2013, now Pat. No. 9,080,674.

(60) Provisional application No. 61/766,519, filed on Feb. 19, 2013.

(51) Int. Cl.
*F16K 5/06* (2006.01)
*F16K 17/14* (2006.01)
*F16K 27/06* (2006.01)
*F16K 27/04* (2006.01)

(58) Field of Classification Search
USPC .......................................... 137/68.21; 138/27
See application file for complete search history.

(56) References Cited

U.S. PATENT DOCUMENTS

| | | | |
|---|---|---|---|
| 2,518,827 A * | 8/1950 | Smith | E03B 7/10 |
| | | | 114/65 R |
| 2,608,201 A | 8/1952 | Henry | |
| 3,027,042 A | 3/1962 | Graves | |
| 3,116,747 A | 1/1964 | Cowles et al. | |
| 3,349,799 A | 10/1967 | Mueller et al. | |
| 3,380,464 A | 4/1968 | Arterbury et al. | |
| 3,443,721 A | 5/1969 | Lujune | |
| 3,464,449 A | 9/1969 | Morton | |
| 3,674,052 A | 7/1972 | Hartman et al. | |
| 3,770,016 A | 11/1973 | Johnstone et al. | |
| 4,027,698 A | 6/1977 | Weinhold | |
| 4,085,770 A * | 4/1978 | Woronowicz | F16K 5/0647 |
| | | | 137/238 |
| 4,146,047 A | 3/1979 | Wood et al. | |
| 4,423,749 A | 1/1984 | Schmitt | |
| 4,573,498 A | 3/1986 | Ludwig | |
| 4,718,444 A | 1/1988 | Boelte | |
| 4,848,389 A | 7/1989 | Pirkle | |
| 4,848,398 A | 7/1989 | Leach | |
| 5,413,134 A | 5/1995 | Burgess et al. | |
| 5,419,357 A | 5/1995 | Lhymn et al. | |
| 5,603,228 A | 2/1997 | Barthold et al. | |
| 5,660,293 A | 8/1997 | Strom | |
| 5,680,953 A | 10/1997 | Baughman | |
| 5,785,074 A | 7/1998 | Kieper | |
| 6,302,373 B1 | 10/2001 | Lee | |
| 6,338,364 B1 | 1/2002 | Mendenhall | |
| 6,363,960 B1 | 4/2002 | Gauss | |
| 6,471,082 B1 | 10/2002 | Fritzinger | |
| 6,832,656 B2 | 12/2004 | Fournier et al. | |
| 7,681,596 B2 | 3/2010 | Reck | |
| 7,789,106 B2 | 9/2010 | Reck | |
| 7,934,515 B1 | 5/2011 | Towsley et al. | |
| 7,950,409 B2 * | 5/2011 | Stokes | E21B 34/063 |
| | | | 137/68.12 |
| 8,220,488 B2 | 7/2012 | McCully | |
| 8,316,886 B2 | 11/2012 | Olden et al. | |
| 8,375,977 B2 | 2/2013 | Jones | |
| 9,334,966 B2 * | 5/2016 | Lehman | F16K 5/06 |
| 2007/0006928 A1 | 1/2007 | Meserlian | |
| 2008/0169443 A1 | 7/2008 | Loloff | |
| 2008/0258092 A1 | 10/2008 | Pettinroli et al. | |
| 2009/0095931 A1 * | 4/2009 | Stunkard | F16K 5/0642 |
| | | | 251/174 |
| 2011/0253351 A1 * | 10/2011 | Murphy | F16L 59/161 |
| | | | 165/135 |
| 2013/0081717 A1 | 4/2013 | Faredon | |

FOREIGN PATENT DOCUMENTS

| | | |
|---|---|---|
| EP | 1966526 | 4/2011 |
| EP | 1649201 | 8/2011 |
| WO | 03001092 | 1/2003 |
| WO | 2005031200 | 4/2005 |

* cited by examiner

FREEZE TOLERANT BALL VALVE

REFERENCE TO RELATED APPLICATIONS

This application claims the benefit of U.S. Non-provisional patent application Ser. No. 14/737,067, entitled: Freeze Tolerant Ball Valve, filed on Jun. 11, 2015 the entire disclosure of which is hereby incorporated by reference, U.S. Non-provisional patent application Ser. No. 13/968,296, entitled: Freeze Tolerant Ball Valve, filed on Aug. 15, 2013 the entire disclosure of which is hereby incorporated by reference, and U.S. Provisional Patent Application having Ser. No. 61/766,519, filed Feb. 19, 2013, entitled Freeze Tolerant Ball Valve, incorporated herein in its entirety by reference.

BACKGROUND OF THE INVENTION

Field of the Invention

This application relates to a method and device for preventing damage from freezing water to a ball-type valve. More particularly, but not by way of limitation, the disclosed invention provides a removable concave plug with a relatively thin-walled floor with scored areas and a thick-walled section on the valve body at a location opposite to the removable concave plug. The scored areas of the plug act create a sacrificial surface that gives away under the pressure from water expansion due to freezing.

Discussion of Known Art

Ball valves have been widely used for controlling the flow of various types of fluids under various conditions. Their use has been favored due to the simplicity of the valve, which in its most basic form consist of a ball with a passage that can be rotated. The rotation allows opening of the valve through the alignment of the passage with the valve inlet and the valve outlet, and then closing the valve by rotating the passage to a position where the passage is no longer exposed to the valve inlet. The simplicity and reliability of ball valves has made them very popular as part of lawn sprinkler systems. However, the passage in the ball of a ball valve makes the valve vulnerable to damage due to freezing of water trapped in the passage during the winter months.

Efforts to alleviate the possibility of damage from freezing include the device disclosed in European Patent Application 2110589 to Cagnacci, which provides a receptacle that is positioned below the ball of the ball valve. The receptacle collects moisture that may lead to damage from freezing of the valve. An important problem associated with the Cagnacci device is that based on observations of ball valves damaged by freezing, the damage due to freezing is consistently found on the side of the ball valve body. See accompanying FIG. 10. It is thus concluded that it is the freezing water that is trapped in the passage through the valve that causes the damage to the ball valve. A possible solution to this problem would be to simply provide a device with drainage ports, such as the valve shown in U.S. Pat. No. 4,027,698 to Weinhold, which uses a drainage to remove the water trapped in the valve body and thus obviate the problem of freezing.

A similar approach to Weinfold's approach is found in U.S. Pat. No. 4,718,444 to Boelte, which discloses the use drainage ports that align with the passage of the ball when the ball is in the closed position. A problem with the provision of a drainage port or valve to drain liquids from the ball passage when the valve is in the closed position is that the homeowner often forgets to open the drainage port before freezing occurs, and thus the valve is damaged during the first freezing of the fall or unexpected freezing in the spring.

U.S. Patent Application Publication No. 2008/0258092 to Pettinaroli et al., which simply exposes the ball passage to a side opening on the ball valve, and the side opening is then capped with a female plastic cap that is tethered to a male extension that protrudes from the side of the valve body. A problem with the Pettinaroli et al. approach is that the damage due to freezing is typically a product of neglect or unexpected freezing temperatures in the fall or in the spring. Accordingly the side outlet is likely to be plugged at the time of freezing, making the plug on a side outlet an ineffective solution.

Therefore, a review of known devices reveals that there remains a need for a simple device that supports a concealed hook for hanging ornaments.

SUMMARY

It has been discovered that the problems left unanswered by known art can be solved by providing a freeze tolerant ball valve that includes: A valve body that includes a ball housing that is positioned between a valve body inlet and a valve body outlet, the ball housing being configured to accept a spherical-shaped gate that includes an axial fluid passage that extends through the center of the spherical-shaped gate, the valve body further having a lower wall and an upper wall, the upper wall having a gate-connection aperture, the gate-connection aperture retaining a shaft that serves to rotate the spherical-shaped gate about its center from a first position where the valve body inlet and the fluid passage align with one another to provide fluid communication between the valve body inlet and the valve body outlet, to a second position, where the valve body inlet and the fluid passage are at a normal relationship relative to one another, with the spherical shaped gate blocking fluid communication between the valve body inlet and the valve body outlet; the valve body having a pair of sidewalls that oppose one another and extend between the upper wall and lower wall, the first sidewall being a of a sidewall thickness and the opposing sidewall having a boss with an aperture that extends through the boss and through the sidewall, the threaded aperture cylindrical; and a concave cap that has a cylindrical outer surface and an internal surface with ridges or discontinuities that are adapted for engaging a mating surface on a wrench, such as a hex key wrench, the concave cap having bottom wall that is of a bottom wall thickness, the bottom wall thickness being thinner than the sidewall thickness.

According to a highly preferred example of the invention, the sidewall thickness is at least twice that of the bottom wall thickness. Additionally, it is contemplated that the bottom wall will include scored or weakened areas that will further reduce the strength of the bottom wall. It has been discovered that the disclosed ball valve directs the expansion of the freezing water that may be found in the spherical gate towards the sacrificial end cap and causes the bottom wall of the concave cap to rupture, saving the rest of the valve from damage from the freezing water. The sacrificial end cap can be readily removed and replaced without having to replace entire ball valve.

The freeze plug, or concave cap, material comprises of various materials ranging from a rigid nonferrous material like brass, to a flexible material that is captured. Suitable flexible materials can be compounds such as rubber, nylon, polyethylene, neoprene, leather, silicone or similar material.

With known devices any crack in a ball valve meant that the entire ball valve unit had to be cut out and replaced. The body of the disclosed valve may be made using any suitable material, such as brass, bronze, or steel.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

Figures 2, 3:
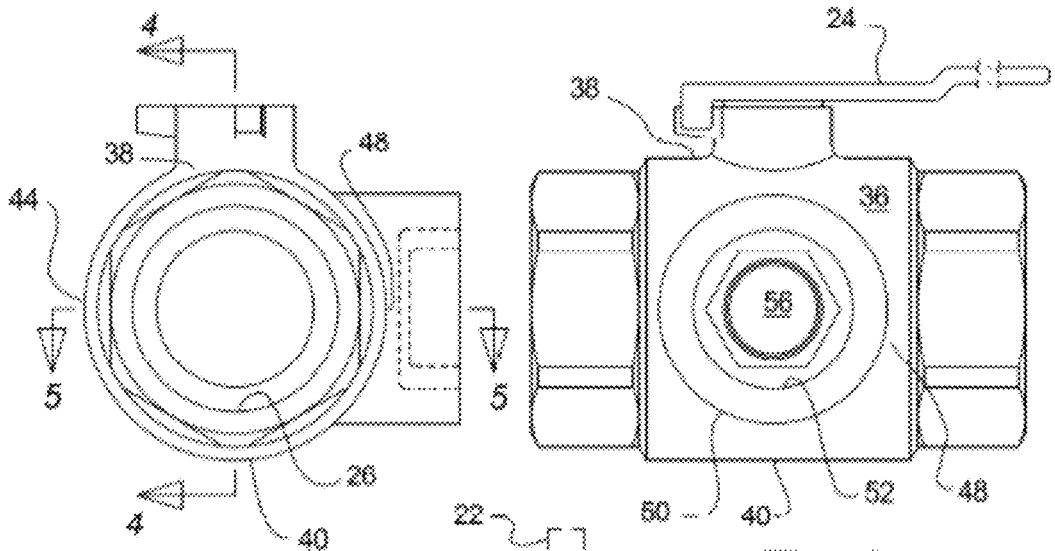
FIG. 2 is an end view of a ball valve body that incorporates a boss with a concave cap, as disclosed here, shown in dashed lines.
FIG. 3 is a side view of a ball valve that uses the ball valve body illustrated in FIG. 2, and also shows concave cap with a scored or weakened area in the shape of a ring.
Figure 5:
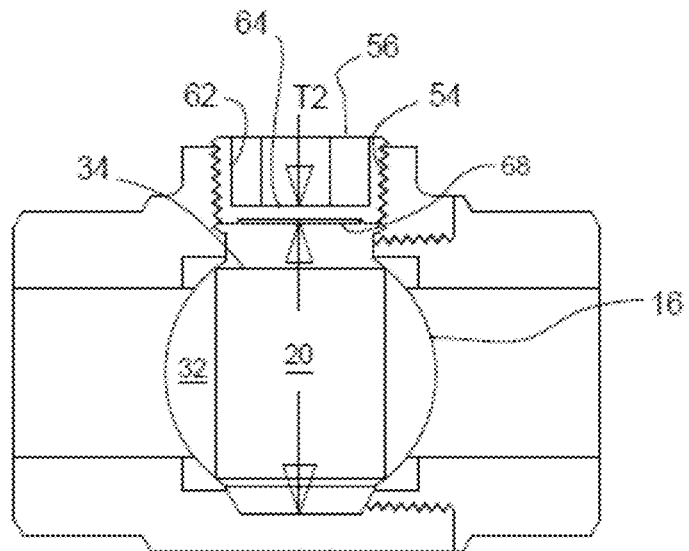

FIG. 5 is a cross-sectional view of the valve body taken from FIG. 2, in the direction of the arrows marked with the number 5, and illustrates the orientation of the fluid passage of the spherical gate such that it directs the expansion of freezing water towards the concave cap. The view also illustrates that the thickness of the first sidewall in the preferred example is approximately twice the predominant thickness of the bottom wall of the concave cap.

Figure 6:
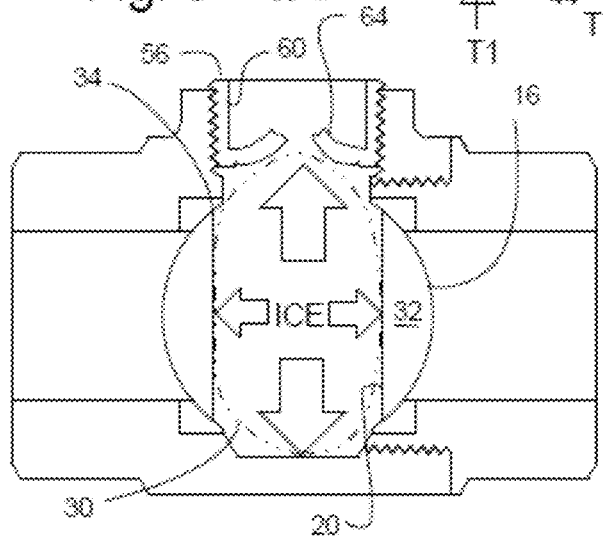

FIG. 6 illustrates the expansion of ice towards the concave cap, rupturing the bottom wall of the concave cap, and alleviating pressure from the rest of the components of the valve.

Figure 7:
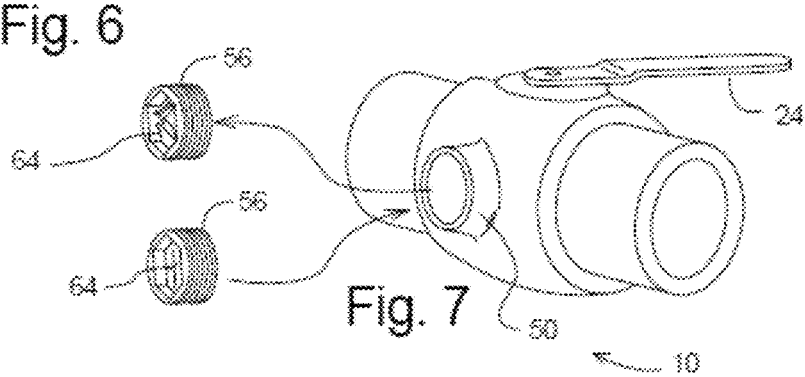

FIG. 7 illustrates the removal of the ruptured concave cap and replacement of the concave cap with an undamaged concave cap.

Figure 8:
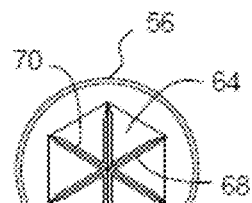

FIG. 8 illustrates an example of the scoring of inner face the bottom wall of the concave cap in order to weaken the bottom wall. FIG. 5 illustrates that this scoring may be on the outer face of the bottom wall.

Figure 9:
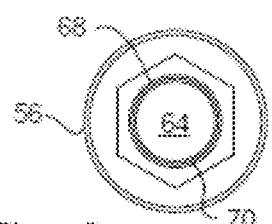

FIG. 9 is another example of the scoring of the bottom wall of the concave cap, the view illustrating a circular scoring.

Figure 10:
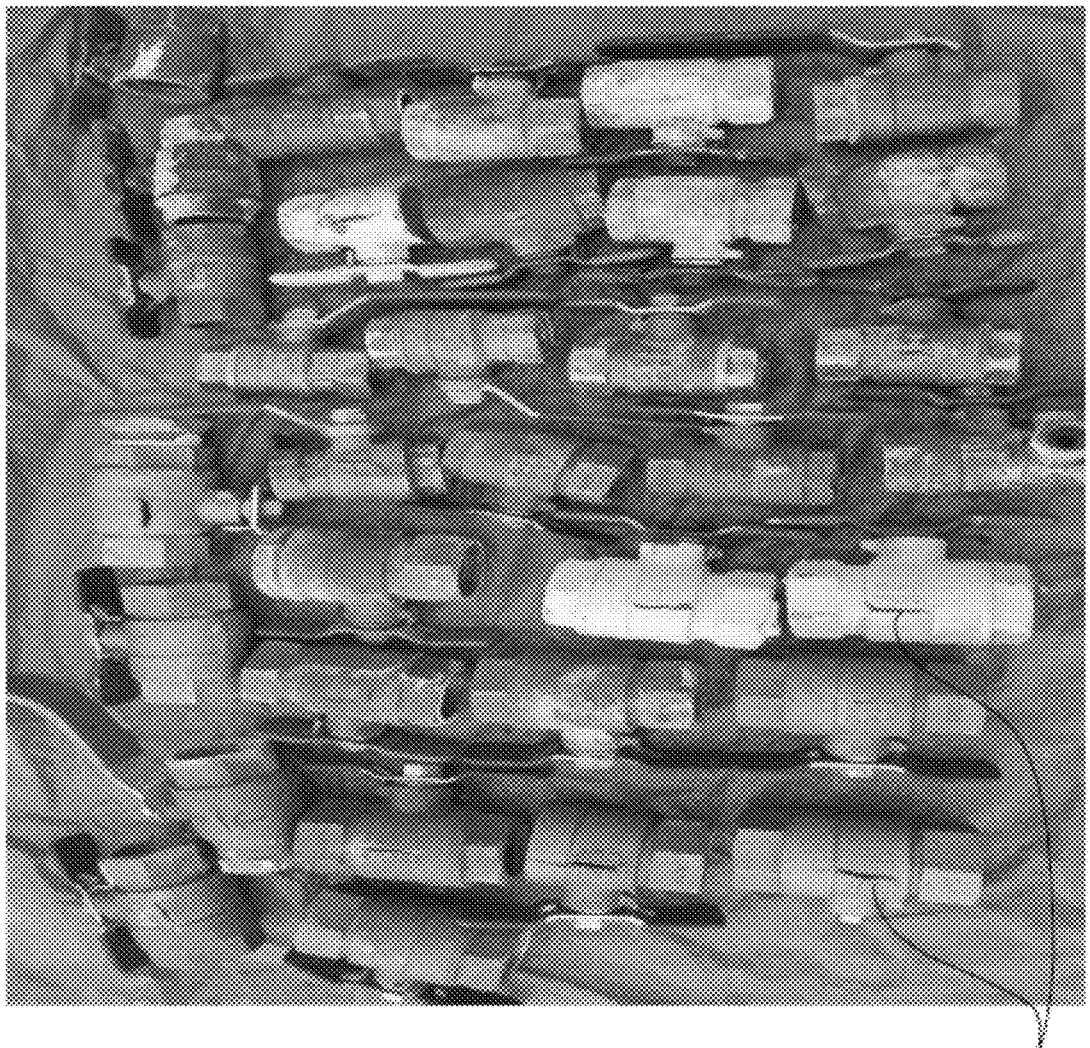

FIG. 10 is a photograph of various ball valves damaged by freezing water, and illustrating that the damage consistently coincides with the location of the ends of the passage through the ball, or spherical-shaped gate.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
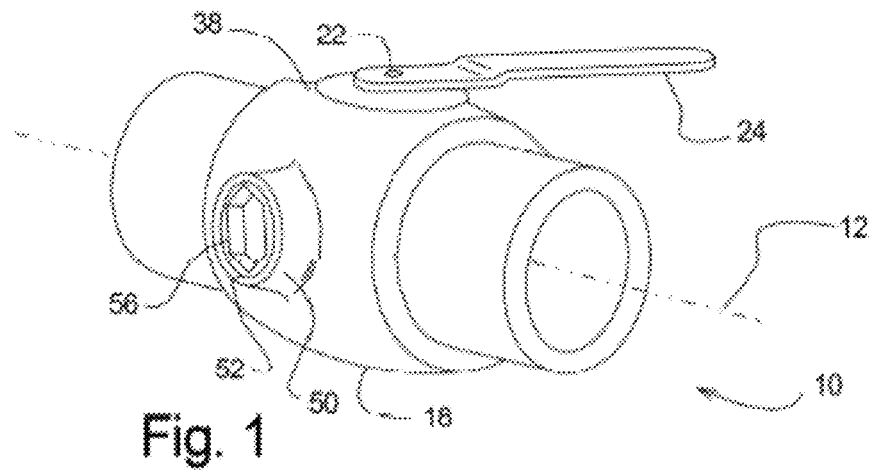
FIG. 1 is a perspective view of a ball valve that incorporates the disclosed invention.

Turning now to FIG. 1 where a freeze tolerant ball valve 10 made in accordance with the principles disclosed herein has been illustrated. Water flows through the ball valve 10 along the axis 12. From FIG. 1 it can be understood that the freeze tolerant ball valve 10 will include a concave cap 56 that fits into a cap aperture 52 that has been incorporated into a boss 50 that extends from the valve body 18. As will be explained below, the structure of the disclosed freeze tolerant ball valve 10 has been configured for controlling the direction of expansion of freezing water that may be found within the ball valve when the ball valve is in the closed position. An example of a ball valve with features found in many well-known styles of ball valves, is found in U.S. Pat. No. 4,218,042 to Eckel, issued Aug. 19, 1980, and incorporated herein in its entirety by reference.

Figure 4:
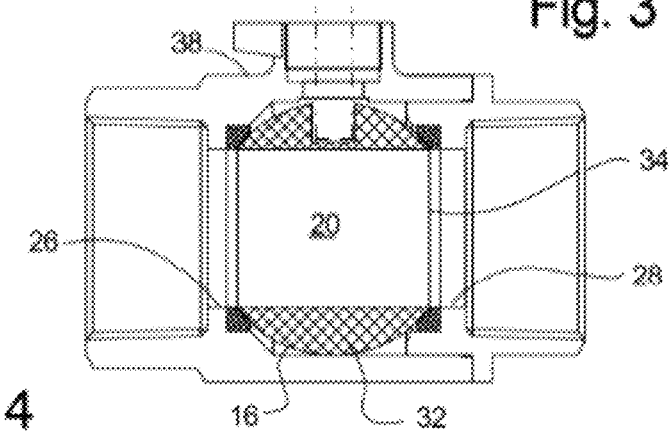
FIG. 4 is a cross-sectional view of the valve body taken from FIG. 2, in the direction of the arrows marked with the number 4, and illustrates the spherical gate with the fluid passage in the spherical gate being directed towards concave cap, which is the position of spherical gate when the ball valve is in the closed position.

As illustrated in FIGS. 2-4, the ball valve 10 will include a spherical-shaped gate 16, which consists of a spherical body 18 and a fluid passage 20 that extends through the spherical body 18. The spherical-shaped gate 16 is connected to a shaft 22 that is in turn connected to a handle or lever 24 that allows the user to turn the spherical body 18 from a first position where the fluid passage 20 is aligned with the valve body inlet 26, and thus aligning the fluid passage 20 of the spherical-shaped gate 16 with both the valve body inlet 26 and the valve body outlet 28, creating fluid communication between the valve body inlet 26 and the valve body outlet 28. Typically, the lever 24 lines up with the axis 20 when the fluid passage 20 is lined up with the valve body inlet 26 and the valve body outlet 28, indicating that the ball valve 10 is in the fully opened position, as illustrated in FIGS. 2 and 3.

Turning the lever 24 to a second position, where the fluid passage 20 of the spherical-shaped gate 16, and the lever 24 are perpendicular to the axis 12 closes fluid communication between the valve body inlet 26 and the valve body outlet 28. Closing of the valve also traps any water that may have been in the fluid passage 20 of the spherical-shaped gate 16. The water remains trapped between the passage 20 and the sidewalls of the valve body.

Accordingly, referring to FIGS. 4-6, it will be understood that the passage 20 of the ball valve 10 will extend across the valve body 18, normal to the axis 12, when the valve is in the closed position, and thus any trapped water 30 in the fluid passage 20 of the spherical-shaped gate 16 will remain trapped within the valve body 18. Thus, referring to FIGS. 5 and 6, it will be understood that if the trapped water 30 begins to freeze, the expansion of the freezing water will expand along the fluid passage 20 of the valve body 18. Also, FIGS. 5 and 6 show that the spherical-shaped gate 16 provides a substantial amount of structural material 32 around the fluid passage 20, which will resist the expansion of the water, and urge the freezing water to expand from the ends 34 of the fluid passage 20, and against the sides 36 of the valve body 18. It is this expansion against the sides 36 of the valve body 18 that has been observed as being the primary cause of damage to the ball valves used in sprinkler systems. The image of numerous failed valves shown on FIG. 10 supports the conclusion that damage to the body of the ball valve from freezing will predominantly occur from the pressure of water expanding along the fluid passage of the spherically-shaped gate found in ball valves.

FIGS. 4, 5, and 6 also show that the valve body 18 will have an upper wall 38 and a lower wall 40. The upper wall 40 includes a gate-connection aperture 42, which provides a passage for the shaft 22 that is used to turn the spherical-shaped gate 16 between the opened and closed positions. The sidewalls of the valve body include a first sidewall 44 that is of a first sidewall thickness T1. Opposite to the first sidewall is a cap supporting sidewall 48. The cap supporting sidewall includes a boss 50 that has a cap aperture 52 that extends through the boss 50, and through the cap supporting sidewall 48. The cap aperture 52 also includes internal threads 54, which are used to cooperate with a concave cap 56 that is used to plug the aperture through the boss 50.

FIG. 5 shows that the concave cap 56 will include a cylindrical outer surface 58 that has been configured for engaging the internal threads 54 in the cap aperture 52. Also, it will be understood from FIGS. 5 and 7 that the concave cap 56 has a concave portion 60 with an internal generally cylindrical surface 62 and a bottom wall 64. The bottom wall is of a bottom wall thickness T2, which is thinner than the thickness of first sidewall thickness T1. According to a preferred example of the invention, T1 is about twice the gage or thickness as T2. Since it is preferred that the concave cap 56 and the valve body 18 will be of the same material, preferably brass, it is contemplated that first sidewall 44 will be approximately twice as strong as the bottom wall 64 of the concave cap 56.

As can be understood from FIGS. 6 and 7, when the valve is closed, the passage 20 of the spherical-shaped gate 16 will extend directly between the first sidewall 44 and the concave cap 56. Thus, by making the bottom wall 64 of the concave cap 56 significantly weaker than the first sidewall 44 of the valve body 18, the expansion of freezing water trapped within the passage 20 and the first sidewall 44 and the concave cap 56 will lead to the rupture of the weaker bottom wall 64 of the concave cap 56 before the failure of the first sidewall 44. The weakening of the bottom wall 64 can be accomplished by simply making the bottom wall 64 thinner than the first sidewall 44 or by incorporating grooves 68, or scored areas, that further weaken the bottom wall 64. Clearly, a combination of a relatively thin bottom wall 64 and grooves will further ensure the failure of the bottom wall 64 before the failure or damage of other components of the ball valve.

As can be understood from FIGS. 5 and 8-9, the grooves 68, or scored areas, may incorporate angled sides 70 that converge towards one another and terminate along a line 70 in order to create a pronounced stress concentration along the groove 68. Also, these figures show that the grooves 68 may extend across the bottom wall in a radial manner or as concentric circular shape, or any other suitable shape.

Referring now to FIGS. 5-7, it will be understood that the fluid passage 20 of spherical-shaped gate 16 and the bottom wall 64 of the concave cap 56 are generally normal to one another when spherical-shaped gate 16 is in the second position. FIG. 6 illustrates that this second position aligns the body of the concave cap 56 with the fluid passage 20, so that expansion of water within the fluid passage 20 will react against the first sidewall 44 and the weaker bottom wall 64, as discussed above. In the event that the bottom wall 64 is ruptured due to freezing, as illustrated in FIG. 6, the plug can be quickly and easily replaced with a new one, as illustrated in FIG. 7.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A ball valve that comprises:
   a ball housing possessing an inlet port and outlet port;
   a spherical-shaped gate disposed in said ball housing, a fluid passage extending through said spherical-shaped gate providing an unobstructed pathway from said inlet port to said outlet port when in an open position and obstructing said pathway when in a closed position; and
   a cap adapted to seal an aperture in said ball housing, said cap adapted to crack before said ball housing when water trapped in said ball housing turns to ice; wherein said cap is a unitary element.

2. The ball valve of claim 1 wherein said cap is threaded and is adapted to mate with mating threads in said aperture.

3. The ball valve of claim 1 wherein said cap is weaker than said ball housing.

4. The ball valve of claim 1 wherein said cap possesses at least one scored section adapted to promote said crack.

5. The ball valve of claim 1 wherein said cap possesses wrench features adapted to mate with a wrench.

6. The ball valve of claim 1 wherein said cap is concave with a cylindrical outer surface and an internal surface with ridges that are adapted to engage a mating surface of a wrench.

7. A ball valve comprising:
   a ball housing possessing an inlet port, and outlet port;
   a spherical-shaped gate disposed in said ball housing, a fluid passageway extending through said spherical-shaped gate providing an unobstructed pathway between said inlet port and said outlet port when said spherical-shaped gate is in an open position and obstructing said pathway when said spherical-shaped gate is in a closed position; and
   a treaded cap adapted to seal a threaded aperture in said ball housing, said treaded cap weaker than said ball housing and will crack instead of said ball housing when water trapped in said ball housing turns to ice; wherein said cap is a unitary element.

8. The ball valve of claim 7 wherein said threaded aperture extends through a boss that supports internal threads.

9. The ball valve of claim 7 wherein said threaded cap possesses a crack initiation site with at least one score.

10. The ball valve of claim 9 wherein said at least one score is on an essentially flat surface of said threaded cap.

11. The ball valve of claim 7 wherein said threaded cap is concave with a cylindrical outer surface and an internal surface with ridges that are adapted for engaging a mating surface of a wrench.

12. The ball valve of claim 7 wherein said threaded cap possesses mating features adapted to engage a wrench.

13. A method comprising:
   providing a ball valve that possesses a ball housing with an inlet port and outlet port;
   moving a spherical-shaped gate disposed in said ball housing from an open position that permits water to flow from said inlet port to said outlet port through a pathway in said spherical-shaped gate to a closed position that obstructs water from flowing from said inlet port to said outlet port;

trapping water in said ball valve when said spherical-shaped gate is in said closed position;

exposing said ball valve to a freezing temperature when said water is trapped in said ball valve;

turning said trapped water into ice; and rupturing a plug that seals an aperture in said ball housing instead of said ball housing when said trapped water turns into said ice; wherein said plug is a flat surface with at least one scored section in said flat surface that is the point of said rupturing when said trapped water turns into said ice.

14. The method of claim 13 further comprising engaging said plug with a wrench, said plug provides features that mate with said wrench.

15. The method of claim 13 wherein said plug possesses plug threads that mate with aperture threads in said aperture.

16. The method of claim 13 further comprising providing a cylindrical-shaped boss extending from said ball valve through which said aperture passes.

17. The method of claim 13 wherein said trapped water will substantially drain through said aperture when said plug is removed while said spherical-shaped gate is in said closed position.

* * * * *